(12) United States Patent
Clarke

(10) Patent No.: US 8,584,512 B2
(45) Date of Patent: Nov. 19, 2013

(54) METHOD AND APPARATUS FOR INSPECTING AIRFOILS

(75) Inventor: Kenneth B. Clarke, Chardon, OH (US)

(73) Assignee: PCC Airfoils, Inc., Beachwood, OH (US)

( * ) Notice: Subject to any disclaimer, the term of this patent is extended or adjusted under 35 U.S.C. 154(b) by 302 days.

(21) Appl. No.: 12/966,177

(22) Filed: Dec. 13, 2010

(65) Prior Publication Data

US 2012/0148355 A1 Jun. 14, 2012

(51) Int. Cl.
*G01B 13/08* (2006.01)
(52) U.S. Cl.
USPC .......................................................... 73/37.5
(58) Field of Classification Search
USPC ................................................ 73/37.5, 37.9
See application file for complete search history.

(56) References Cited

U.S. PATENT DOCUMENTS

| | | | |
|---|---|---|---|
| 3,353,402 A * | 11/1967 | Caligiuri | 73/37.5 |
| 3,438,244 A | 4/1969 | Plumpe, Jr. | 73/37.9 |
| 3,513,688 A | 5/1970 | Thibault | 73/37.9 |
| 4,063,449 A | 12/1977 | Griggs | 73/37.9 |
| 4,121,451 A | 10/1978 | Radev et al. | 73/37.9 |
| 5,152,166 A | 10/1992 | Brock et al. | 73/37.9 |
| 5,358,029 A | 10/1994 | Baveja et al. | 164/516 |

* cited by examiner

*Primary Examiner* — Peter Macchiarolo
*Assistant Examiner* — Tamiko Bellamy
(74) *Attorney, Agent, or Firm* — Tarolli, Sundheim, Covell & Tummino LLP

(57) ABSTRACT

To inspect recesses in sides of an airfoil, gauge heads are moved into engagement with the recesses. Fluid pressure is conducted to the recesses while the gauge heads are in engagement with the recesses. A determination is made as to whether the rate of leakage of fluid from the recesses is greater than or less than a predetermined rate. If the rate of leakage of fluid is greater than a predetermined rate, one or more of the recesses is unacceptable. However, if the rate of leakage of fluid pressure is less than the predetermined rate, the recesses are acceptable.

12 Claims, 7 Drawing Sheets

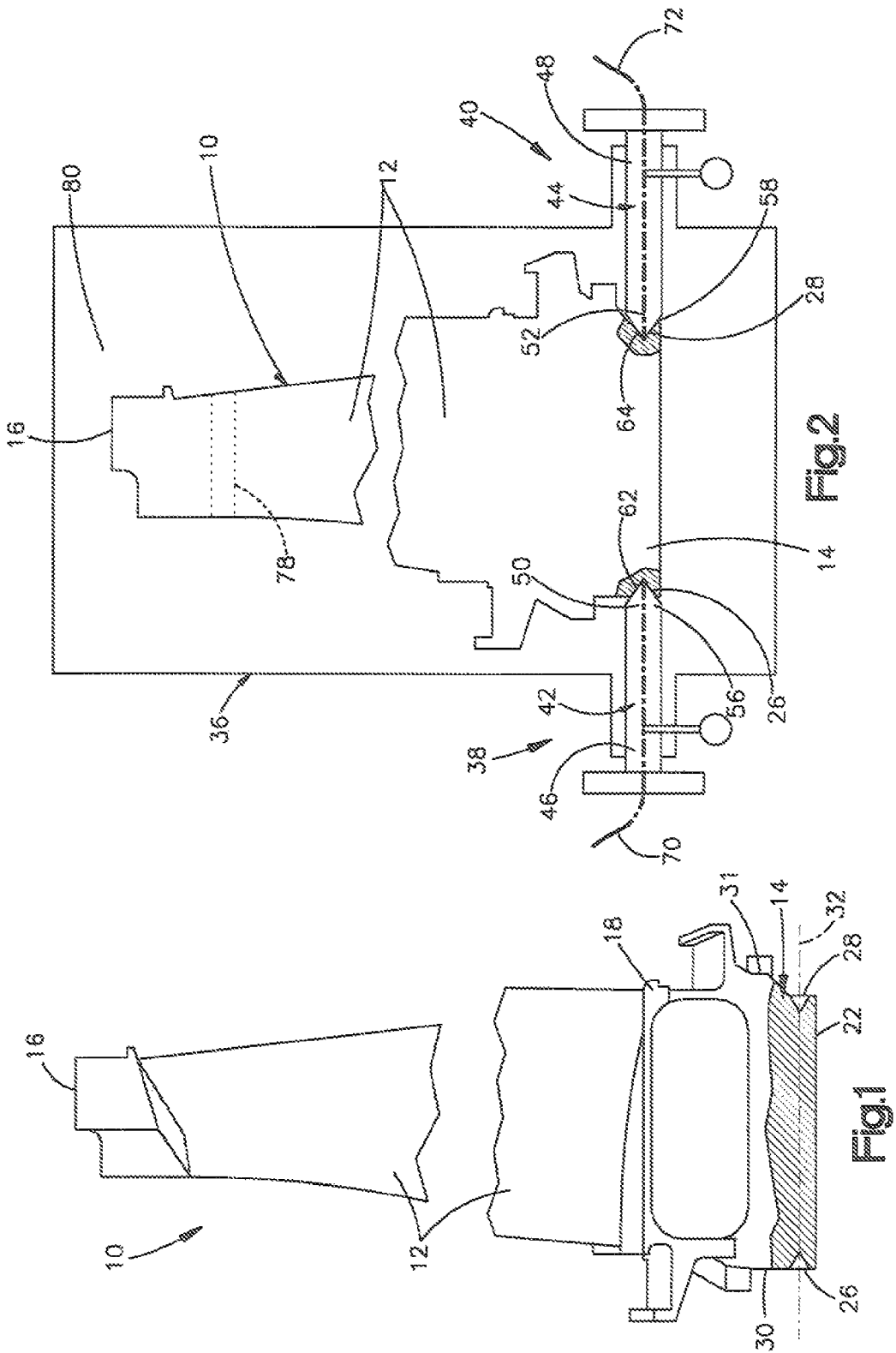

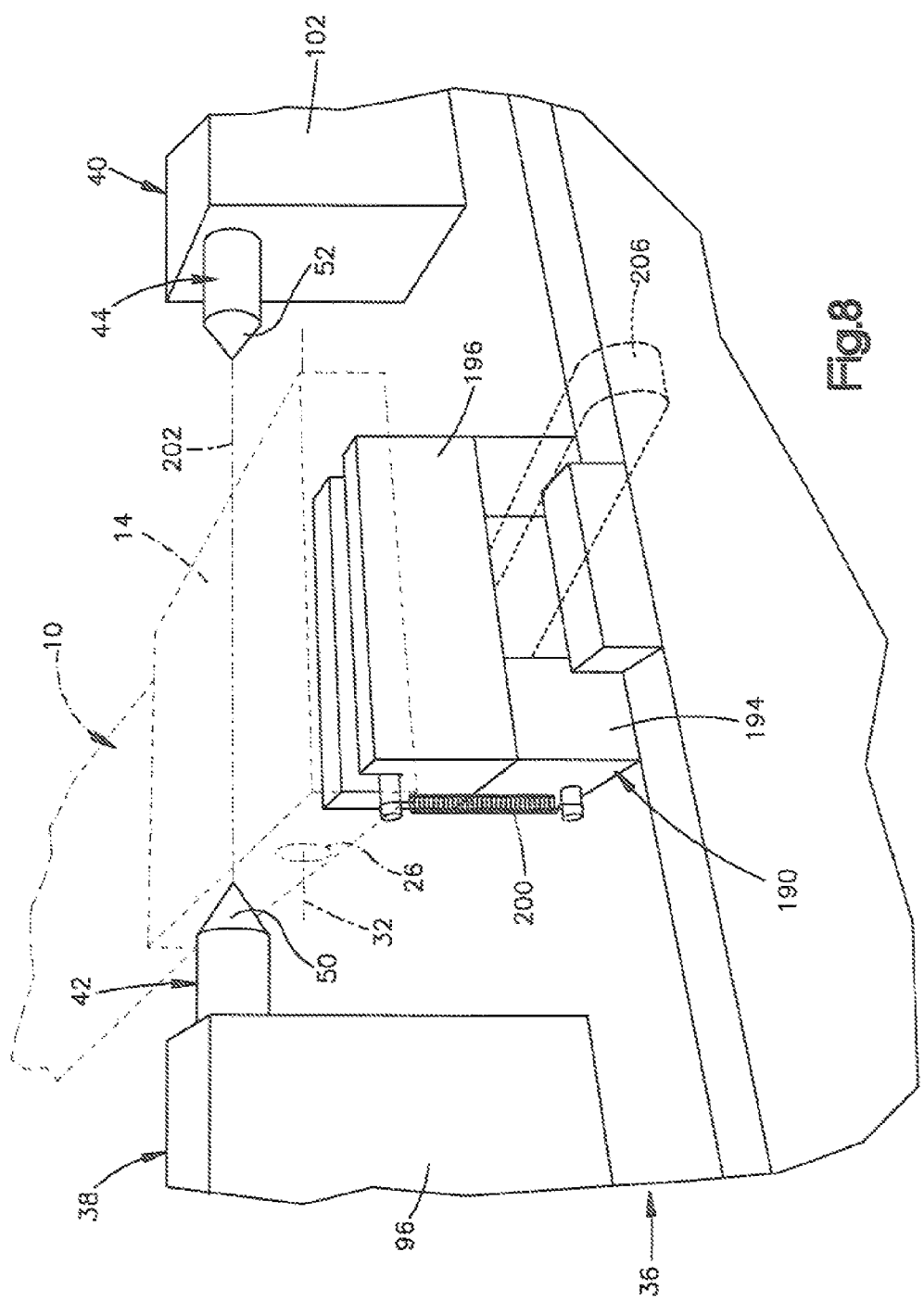

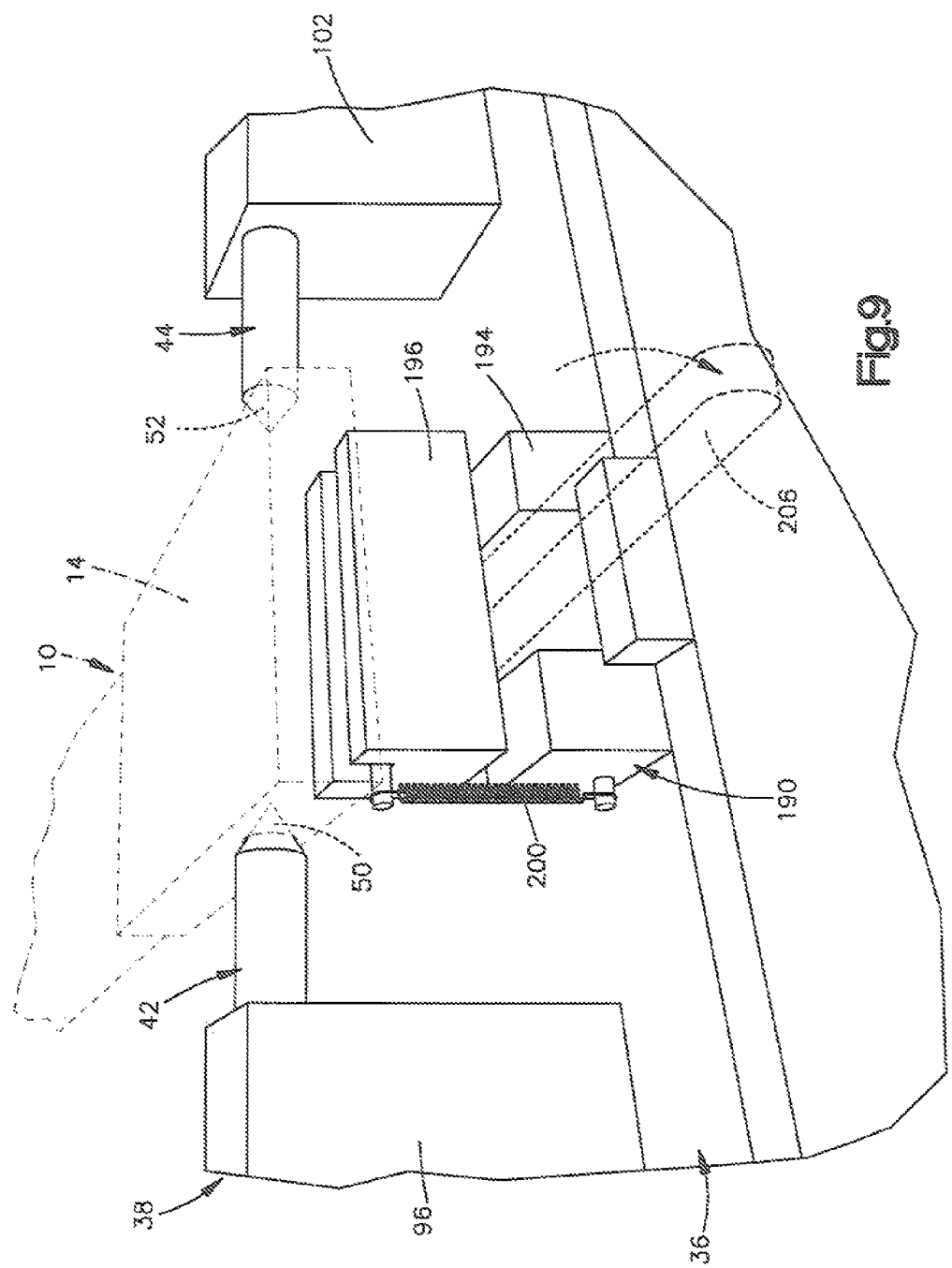

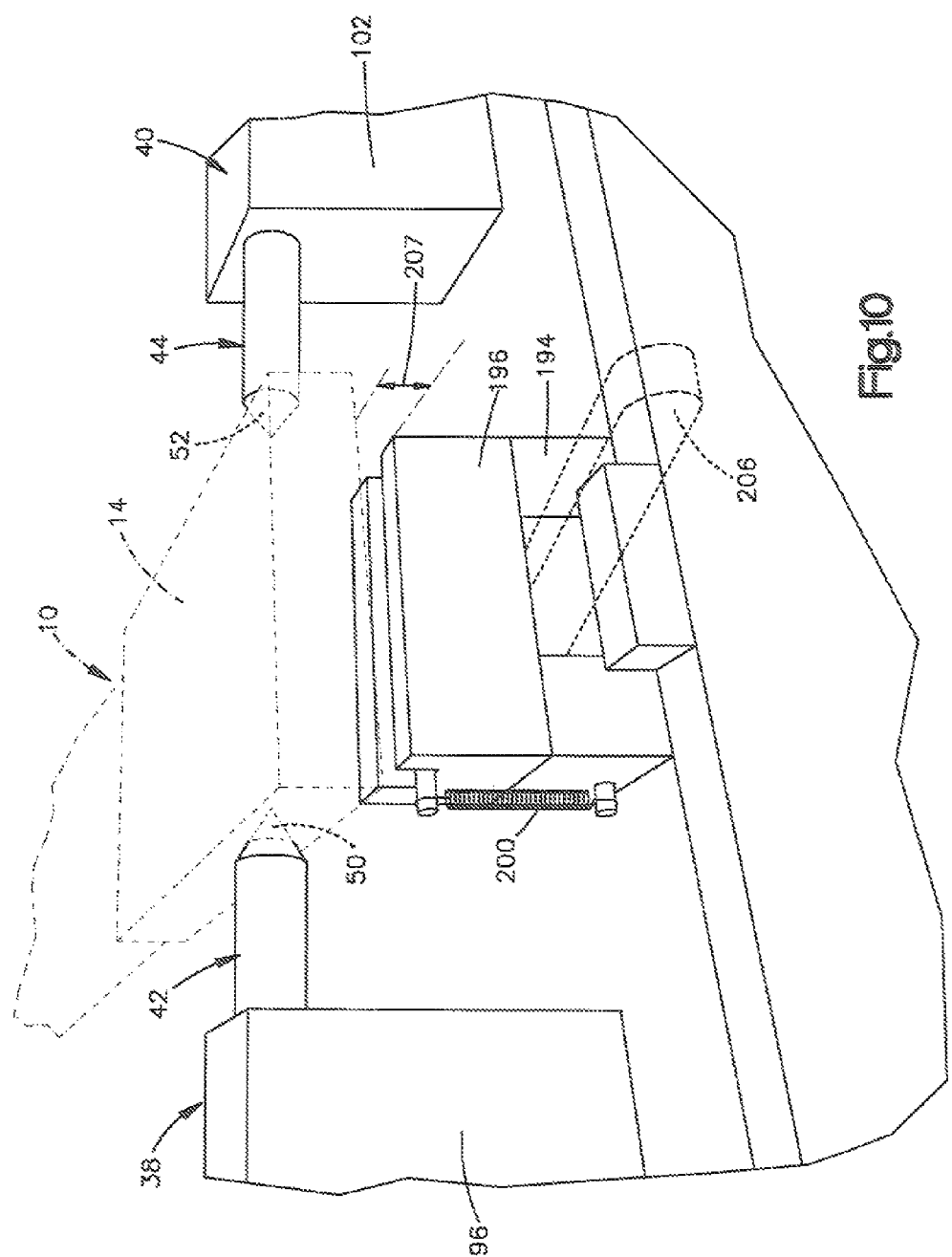

METHOD AND APPARATUS FOR INSPECTING AIRFOILS

BACKGROUND OF THE INVENTION

The present invention provides a new and improved method and apparatus for use in inspecting recesses formed in airfoils.

Airfoils have previously been formed with locating recesses in opposite sides of a root portion of each airfoil. The recesses are drilled after the airfoil is cast. After the recesses have been drilled, the airfoil may be sent to a customer for further machining. The recesses are used to locate the airfoil during machining by the customer.

In the past, a substantial percentage of the airfoils have been rejected by a customer due to inaccurately formed locating recesses. The recesses must have a substantially perfect geometry after being formed with a drill. A drill which has been worn even slightly, for example, by an amount which is undetectable by visual inspection of the drill, may form recesses which are not acceptable to the customer as a datum for further machining operations.

SUMMARY OF THE INVENTION

An improved method of inspecting recesses formed in an airfoil includes engaging a surface formed in a first side of the airfoil with a surface on a first gauge head. A surface of a second recess formed in a second side of the airfoil is engaged by a surface on a second gauge head. Fluid pressure is conducted to the recesses in the airfoil while the surfaces on the gauge heads are disposed in engagement with the recesses. A determination is made as to whether or not a rate of leakage of fluid pressure from the recesses in the airfoil is greater than or less than a predetermined rate.

If desired, the airfoil may be at least partially supported by the gauge heads during the conducting of fluid pressure to the recesses. In one specific embodiment, the recesses had coincident central axes. In this embodiment, the forces applied by the gauge heads were directed in opposite directions along coincident central axes of the recesses. In one specific embodiment, a lifting apparatus was used to move the recesses toward a position in which the recesses are aligned with the gauge heads.

The present invention has many different features. These features may, be utilized together in the manner disclosed herein. Alternatively, these features may be used separately or used in different combinations with features from the prior art. For example, the gauge heads may be used without the lifting apparatus.

BRIEF DESCRIPTION OF THE DRAWINGS

The foregoing and other features of the present invention will become more apparent upon a consideration of the following description taken in connection with the accompanying drawings wherein:

FIG. 1 is a fragmentary schematic illustration of an airfoil having a known construction and having a root portion in which recesses are formed;

FIG. 2 is a schematic illustration, on a reduced scale, depicting the manner in which the recesses in an airfoil are engaged by gauge heads while the airfoil is supported by the gauge heads;

FIG. 8 is a schematic illustration of the fixture of FIG. 5 with a lifting apparatus disposed between the gauge heads, the lifting apparatus being shown supporting an airfoil in a lowered position;

FIG. 9 is an schematic illustration further showing the construction of the lifting apparatus of FIG. 8, the lifting apparatus being shown supporting an airfoil in a raised position; and FIG. 10 is a schematic illustration depicting engagement of an airfoil by the gauge heads while the airfoil is supported by the gauge heads with the lifting apparatus lowered and spaced from the airfoil.

DESCRIPTION OF SPECIFIC PREFERRED EMBODIMENTS OF THE INVENTION

Figure 3:
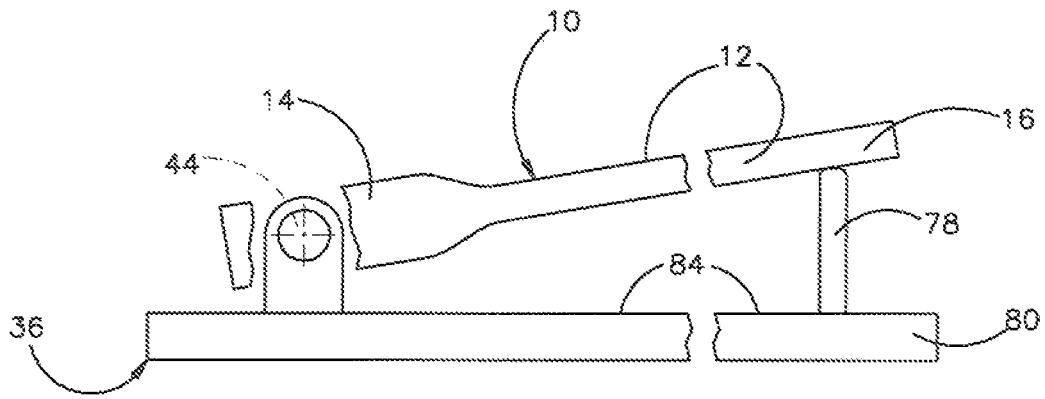
FIG. 3 is a schematic illustration, taken generally along the line of 3-3 of FIG. 2, further illustrating the manner in which the airfoil is supported by the gauge heads.

An airfoil 10 having a known construction, is illustrated schematically in FIG. 1. The airfoil 10 is a blade which is intended for use in a turbine engine. However, the airfoil 10 may be a vane which is used in a turbine engine. It is contemplated that the airfoil 10 may be utilized in many different environments. For example, the airfoil 10 may be used in an engine of an aircraft. Alternatively, the airfoil 10 may be used in a stationary power plant.

The illustrated airfoil 10 has a known construction and is intended for use in a stationary power plant. The illustrated airfoil 10 is a relatively large blade or bucket and may have a length of up to about 36 inches and weigh up to about 40 pounds. It should be understood that the foregoing length and weight for the illustrated airfoil 10 are only indicative of a large range of lengths and weights and are set forth herein for purposes of clarity of description and not for purposes of limiting the invention.

While the illustrated airfoil 10 is relatively large and is intended for use in a stationary power plant, it is contemplated that the airfoil could have a different construction and be used in an engine of an aircraft. Airfoils 10 intended for use in an aircraft engine may be small, perhaps only a few inches long, and may be relatively light in weight, perhaps only a few ounces. It is contemplated that the airfoil 10 may be constructed so as to be adapted for use in a stationary power plant. Alternatively, it is contemplated that the airfoil 10 may be constructed so as to be adapted for use in an aircraft engine.

The illustrated airfoil 10 includes an airfoil portion 12 and a root portion 14. The airfoil portion 12 extends between a tip portion 16 of the airfoil and a platform 18. The root portion 14 extends between a root end 22 and the platform 18.

In the embodiment illustrated in FIG. 1, locating recesses 26 and 28 are disposed in opposite sides 30 and 31 of the root portion 14 of the airfoil 10. The recesses 26 and 28 have coincident central axes indicated at 32 in FIG. 1. Although the recesses 26 and 28 are disposed in a coaxial relationship with each other and on opposite sides of the airfoil 10, it is contemplated that the recesses could be disposed in a different spatial relationship relative to each other.

For example, the recess 28 may be offset upwardly (as viewed in FIG. 1) from the recess 26 so that the two recesses are not disposed in a coaxial relationship. As another example, the recesses 26 and 28 may not be disposed on opposite sides of the root portion 14 of the airfoil 10. If desired, recesses may be formed in the tip portion 16 and/or the root portion 14. Although two recesses 26 and 28 are illustrated in FIG. 1, a greater or lesser number of recesses may be provided if desired.

If the airfoil 10 is formed as a vane, recesses may be disposed at either or both ends of the vane. Regardless of whether the airfoil 10 is formed as a blade or vane, it may be desired to provide recesses in opposite sides of the blade or vane at each of the opposite ends of the blade or vane. The recesses at one end of the blade or vane may have axes which extend perpendicular to or are skewed at acute angles to the axes of recesses at the opposite end of the blade or vane.

The locating recesses 26 and 28 are utilized as datum points to position the airfoil 10 for subsequent machining operations. If the locating recesses 26 and 28 are not precisely formed and accurately located relative to each other, the airfoil 10 can not be accurately positioned for the subsequent machining operations. These machining operations may include direct engagement of a cutting and/or grinding tool with the airfoil 10. Alternatively, the machining operations may be performed by electron beam, laser, fluent abrasive, and/or ultrasonic machining methods. It is contemplated that electrical discharge machining and/or electrochemical machining methods may be used on the airfoil 10. Of course other machining processes may be used.

After the locating recesses 26 and 28 have been formed in the airfoil 10, the airfoil is positioned in a fixture 36 (FIGS. 2 and 3) to enable the recesses 26 and 28 to be inspected to determine if they have been accurately formed by a drilling operation. If the drilling operation is performed with a drill which is even slightly worn and/or chipped, the recesses 26 and 28 may not be formed with the desired accuracy. During the drilling operation, the recesses 26 and 28 are simultaneously formed by engaging the opposite sides 30 and 31 of the root portion 14 of the airfoil 10 with a pair of drills which are disposed in a coaxial relationship. However, the recesses 26 and 28 may be sequentially formed if desired. It is contemplated that the recesses 26 and 28 may be formed by operations other than drilling operations.

If the drilling operation utilized to form the recesses 26 and 28 and results in inaccurately formed recesses, the airfoil 10 can not be accurately positioned for subsequent machining operations. The illustrated recesses 26 and 28 are formed with a No. 4 radial center drill having a sixty degree cone at the end of the drill. Of course, other types of tools may be utilized to form the recesses. For example, the recesses may be formed with a milling tool. As another example, electrochemical machining operations may be used to at least partially form the recesses 26 and 28.

The recesses 26 and 28 may be formed with a configuration which is different than the illustrated conical configuration. For example, the recesses 26 and 28 may be cylindrical, polygonal or formed as a portion of a sphere. Although a single recess 26 or 28 has been shown in each of the sides 30 and 31, a plurality of recesses may be formed in either one or both of the sides.

The illustrated conical recesses 26 and 28 have an included angle of sixty degrees at the peak or bottom of the recesses. The peaks of the coaxial conical recesses 26 and 28 are disposed on the axis 32 (FIG. 1). The recesses 26 and 28 both have the same configuration and are formed to the same depth. However, it is contemplated that the recesses 26 and 28 could have different configurations and/or different depths. For example, the recess 26 may have cylindrical configuration while the recess 28 has a polygonal configuration. If the recesses 26 and 28 are formed with the illustrated conical configuration, the recesses may have different included angles at their peaks. As was previously mentioned, the recesses 26 and 28 do not have to be in the illustrated coaxial relationship. For example, the recess 28 could be offset upwardly (as viewed in FIG. 1) from the axis 32.

When the airfoil 16 is to be inspected to determine if the recesses 26 and 28 have been accurately formed with the desired configuration at the desired locations in the airfoil 10, the airfoil is positioned in a fixture 36 in the manner illustrated schematically in FIGS. 2 and 3. The coaxial recesses 26 and 28 are then engaged by coaxial gauge heads 38 and 40. The gauge heads 38 and 40 include centers or locators 42 and 44 (FIG. 2).

The recesses 26 and 28 may be simultaneously engaged by the centers 42 and 44. Alternatively, the recesses 26 and 28 may be sequentially engaged by the centers 42 and 44. The center 42 applies a rightward (as viewed in FIG. 2) force against the recess 26. The center 44 applies a leftward (as viewed in FIG. 2) force against the recess 28.

The centers or locators 42 and 44 have cylindrical bodies 46 and 48 with coaxial conical end portions 50 and 52. The conical end portions 50 and 52 have conical configurations which are the same as the desired conical configuration of the locating recesses 26 and 28. Thus, the conical end portions 50 and 52 of the centers 42 and 44 each have an included angle of sixty degrees (60°) and have the same configuration as the recesses 26 and 28.

The end portions 50 and 52 may be formed with configurations which are different than the illustrated conical configurations of the recesses 26 and 28. For example, the end portions 50 and 52 may be formed with an included angle which is either greater than or less than the included angle of the recesses 26 and 28. As another example, the end portions 50 and 52 may be formed with a configuration which is not conical.

Assuming that the recesses 26 and 28 have been accurately formed in the airfoil 10, conical outer side surfaces on the centers or locators 42 and 44 are pressed against the conical inner side surfaces 62 and 64 of recesses 26 and 28, in the manner illustrated schematically in FIG. 2. Fluid under pressure (air) is conducted through the centers 42 and 44 to the recesses 26 and 28 through conduits or passages formed in the gauge heads 38 and 40 and indicated schematically at 70 and 72 in FIG. 2. If the recesses 26 and 28 have been accurately formed with the desired configuration, the conical outer side surfaces 56 and 58 on the end portions 50 and 52 of the centers 42 and 44 abuttingly engage the conical inner side surfaces 62 and 64 of the recess and form seals between the centers 42 and 44 and the recesses 26 and 28 in the airfoil 10. This results in the air pressure being maintained in the conduits 70 and 72 for at least a predetermined length of time.

If the recesses 26 and 28 have not been accurately formed, there will not be abutting engagement between the conical outer side surfaces 56 and 58 (FIG. 2) on the centers 42 and 44 and the conical inner side surfaces 62 and 64 of the recesses 26 and 28 throughout the extent of the conical inner side surfaces 62 and 64 of the recesses. This results in little or no sealing action between the recesses 26 and 28 and the centers 42 and 44. This enables fluid (air) to leak from the recesses with a resulting decrease in the fluid pressure in the conduits 70 and 72.

If fluid pressure leaks down from the recesses 26 or 28 at a rate which is less than a predetermined rate, the surfaces 62 and 64 of the recesses 26 and 28 will have been accurately formed. However, if the rate of leakage of fluid pressure from one or more of the recesses 26 and/or 28 is greater than the predetermined rate, the recesses 26 and/or 28 will not have been accurately formed. The rate at which fluid pressure leaks down from the recesses 26 and 28 is determined by the length of time for which a predetermined minimum fluid pressure is maintained in the conduits 70 and 72 and in the recesses 26 and 28.

Figure 4:
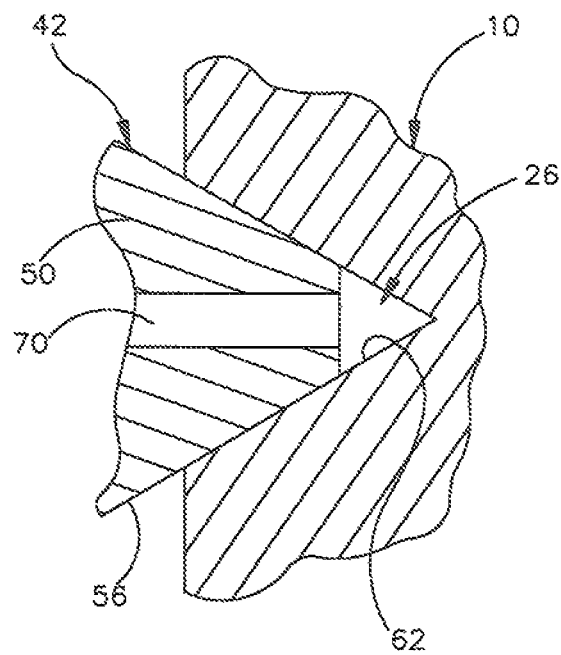
FIG. 4 is an enlarged fragmentary schematic illustration depicting the manner in which a recess is engaged by a gauge head.

The manner in which the conical outer side surface 56 of the center or locator 42 is pressed against the conical inner side surface 62 of the recess 26 is illustrated schematically in FIG. 4. Assuming that the recess 26 has been accurately formed, the conical outer side surface 56 on the end portion 50 of the center or locator 42 will be disposed in abutting engagement with the conical inner side surface 62 of the recess 26 throughout the extent of the portion of the center or locator 42 which is received in the recess 26. However, if for some unforeseen reason the recess 26 is inaccurately formed, there will be a slight gap at some locations where the outer side surface 56 on the center or, locator 42 should engage the inner side surface 62 of the recess. This slight gap will allow the pressurized fluid (air) conducted to the recess through the conduit 70 to leak out within a relatively short period of time.

Although only the center 42 is illustrated in FIG. 4, it should be understood that the center 44 cooperates with the recess 28 in the same manner as the center 42 cooperates with the recess 26. If desired, the end portions 50 and 52 of the centers 42 and 44 may have a different configuration. For example, the end portions 50 and 52 of the centers 42 and 44 may have a pointed conical configuration with one or more fluid pressure outlets in the conical side surfaces of the end portions adjacent to the peaks of the conical outer side surfaces 56 and 58. If desired, slots may be formed across the end portions 50 and 52 of the centers 42 and 44.

In the embodiment of the invention illustrated in FIGS. 1-4, the centers 42 and 44 have end portions 50 and 52 with conical configurations which correspond to the desired conical configurations of the inner side surfaces 62 and 64 of the recesses 26 and 28. However, it is contemplated that the centers or locators 42 and 44 may have end portions 50 and 52 with configurations which are different than the desired configuration of the recesses 26 and 28. For example, the end portions 50 and 52 of the locators 42 and 44 may be formed with a generally hemispherical configuration. It should be understood that the end portions 50 and 52 of the centers 42 and 44 may have any desired configuration which may be the same as the desired configuration for the recesses 26 and 28 or may be different than the desired configuration of the recesses 26 and 28.

The fixture 36 is constructed in such a manner that the airfoil 10 is supported by the centers or locators 42 and 44 in the gauge heads 38 and 40. By having the airfoil 10 supported by the centers 42 and 44, accurate alignment of the centers 42 and 44 with the recesses 26 and 28 is promoted. Thus, the root end portion 14 of the airfoil 10 may be manually positioned in the fixture 36 between the centers or locators 42 and 44. At this time, the distance between the centers 42 and 44 may be greater than the distance between, opposite sides of the root end portion 14 of the airfoil 10.

The distance between the centers or locators 42 and 44 is then decreased so that the conical end portions 52 and 54 of the centers 42 and 44 engage the recesses 26 and 28. As the conical outer side surfaces 56 and 58 on the centers 42 and 44 engage the recesses 26 and 28, there may be a camming action between the outer side surfaces on the centers and the inner side surfaces 62 and 64 of the recesses. This camming action is effective to compensate for any slight misalignment of the centers 42 and 44 and the recesses 26 and 28. This results in the centers 42 and 44 being in a coaxial relationship with the recesses 26 and 28.

Due to the camming action between the end portions 50 and 52 of the centers 42 and 44 and the recesses 26 and 28, the central axis 32 of the recesses 26 and 28 is accurately located in a coaxial relationship with the cylindrical bodies 46 and 48 of the centers or locators 42 and 44. If the airfoil 10 was gripped by the fixture 36 before the centers 42 and 44 move into engagement with the recesses 26 and 28, there could be a slight misalignment between the coincident central axes 32 of the recesses 26 and 28 and the coincident central axes of the centers 42 and 44. This slight misalignment could result in the formation of a leak down path so that the fluid pressure in the conduit 70 and 72 and recesses 26 and 28 decreases in a relatively short time even though the recesses 26 and 28 are accurately formed. By having the root end portion 14 of the airfoil 10 supported by the centers 42 and 44, the root end portion of the airfoil is accurately positioned by engagement of the centers or locators 42 and 44 with the recesses 26 and 28.

The airfoil 10 engages a support or lean bar 78 which extends upward from a base 80 of the fixture 36 in the manner illustrated schematically in FIG. 3. The support 78 engages the airfoil portion 12 to position the airfoil 10 above the base 80. However, the support 78 may engage the tip portion 16 of the airfoil 10 if desired. Although the tip portion 16 of the airfoil 10 is supported by the support 78, the root portion 14 of the airfoil is supported by only the centers 42 and 44.

The centers 42 and 44 in the gauge heads 38 and 40 engage the root portion 14 of the airfoil 10 to support the root portion above the base 80. Thus, the airfoil 10 is supported in a spaced apart relationship with the base 80 by the support 78 and centers 42 and 44.

In the embodiment of the invention illustrated in FIGS. 2 and 3, the airfoil 10 is supported by the fixture 36 with a longitudinal central axis of the airfoil skewed at an acute angle relative to the base 80 (FIG. 3). However, the airfoil 10 may be supported in a different orientation relative to the base 80 if desired. For example, the airfoil 10 may be supported with its longitudinal central axis horizontal, that is, extending parallel to an upper side surface 84 of the base 80. Alternatively, the airfoil 10 may be supported in a vertical orientation with the longitudinal central axis of the airfoil extending perpendicular to the upper side surface 84 of the base 80.

Figure 5:
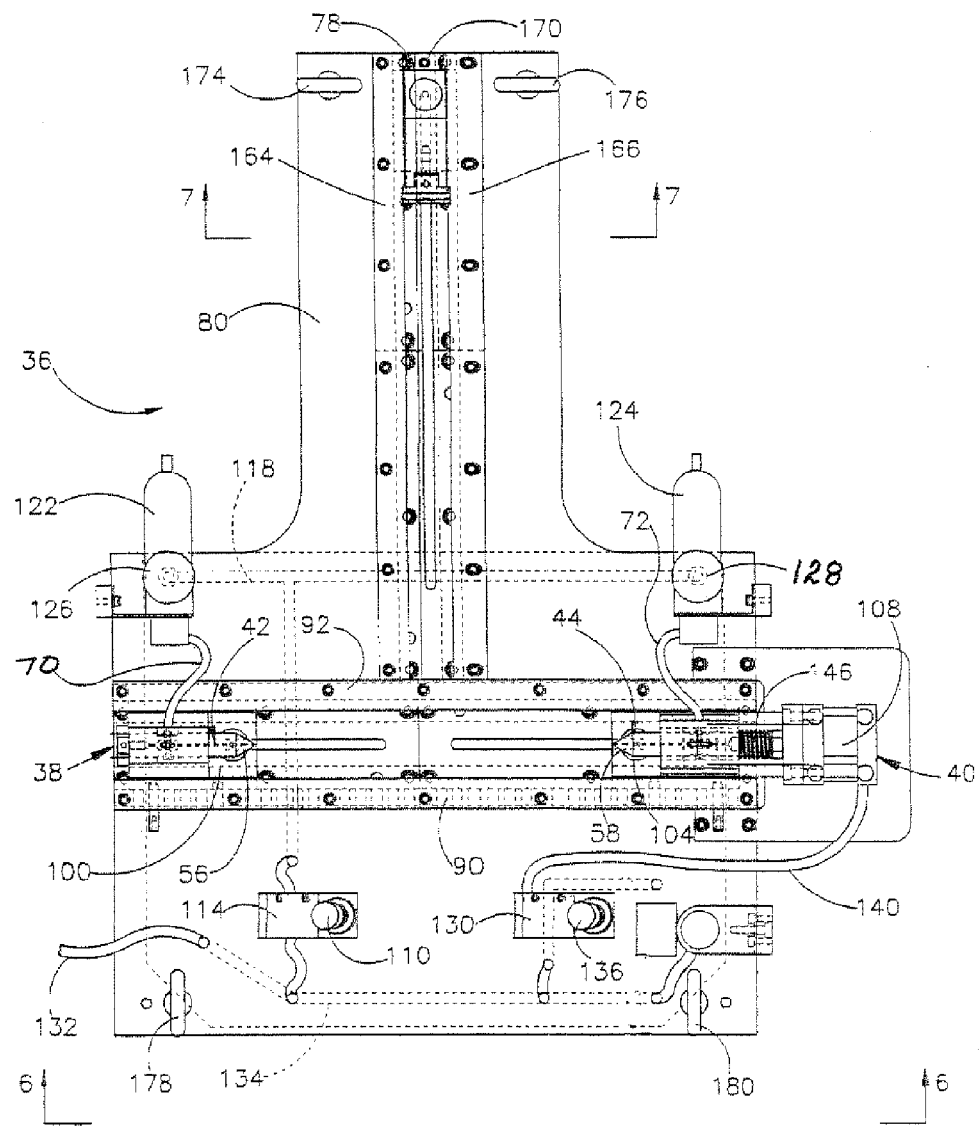
FIG. 5 is a schematic illustration of a fixture in which the gauge heads are disposed.
Figure 6:
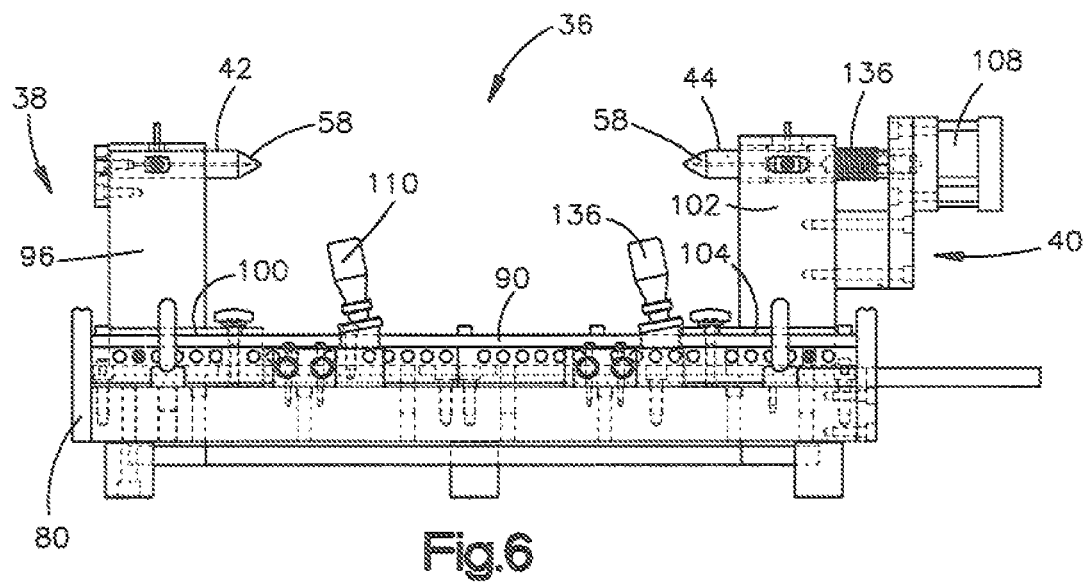
FIG. 6 is an elevational view, taken generally along the line 6-6 of FIG. 5, further illustrating the construction of the fixture.
Figure 7:
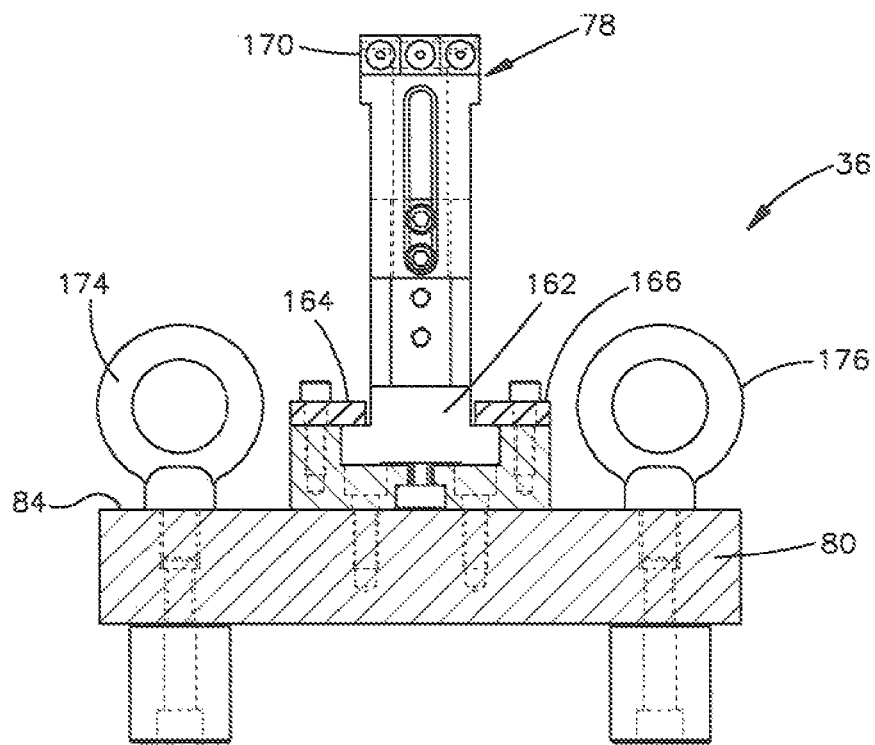
FIG. 7 is a sectional view, taken generally along the line 7-7 of FIG. 5 further illustrating the construction of the fixture.

One specific embodiment of the fixture 36 is illustrated in FIGS. 5-7. The fixture 36 includes a base 80 (FIG. 5) on which the gauge heads 38 and 40 are supported and on which the support 78 is disposed (FIG. 5). In this embodiment of the invention, the center or locator 42 (FIGS. 5 and 6) is stationary relative to the base 80. The center or locator 44 is movable relative to the base 80.

A pair of parallel rails 90 and 92 (FIG. 5) are provided on the base 80. The rails 90 and 92 position a support column 96 (FIG. 6) on which the center or locator 42 of the gauge head 38 is disposed. The support column 96 is disposed on a slide 100 (FIG. 5) which is held against movement relative to the rails 90 and 92. The slide 100 enables the stationary center or locator 42 to be adjusted to accommodate airfoils 10 having root end portions 14 with different sizes and/or configurations.

The center or locator 44 in the gauge head 40 is disposed on a support column 102 (FIG. 6). The support column 102 is disposed on a slide 104. The slide 104 is movable along the rails 90 and 92. The rails 90 and 92 position the gauge heads 38 and 40 with the centers 42 and 44 in a coaxial relationship.

When the gauge head 40 has been moved to a desired position, the slide 104 is fixed against movement along the rails 90 and 92.

The slides 100 and 104 for the gauge heads 38 and 40 are located on the rails 90 and 92 with the centers or locators 42 and 44 spaced apart by a distance sufficient to enable the root end portion 14 of the airfoil to be readily positioned between the centers or locators. The root portion 14 of the airfoil is positioned between the fixed and movable centers 42 and 44. The root portion 14 may initially be disposed in engagement with the rails 90 and 92 while the tip portion 16 engages the support 78.

The root portion 14 is then manually lifted to a position in which the recesses 26 and 28 are in visual alignment with the centers 42 and 44. A piston and cylinder type pneumatic motor 108 (FIGS. 5 and 6) is then operated to move the center or locator 44 toward the stationary opposite center or locator 42. As this occurs, the conical outer side surfaces 56 and 58 on the centers or locators 42 and 44 engage and are pressed against the conical inner side surfaces of the recesses 26 and 28. The conical outer side surfaces 56 and 58 on the centers 42 and 44 cooperate with the conical inner side surfaces 62 and 64 on the recesses 26 and 28 to cause the root end portion 14 of the airfoil 10 to move to a position in which the central axes of the centers 42 and 44 are disposed on the central axis 32 (FIG. 1) of the recesses 26 and 28.

Although only the center 44 is moved relative to its support column 102 and the base 80, it is contemplated that both centers 42 and 44 may be movable relative to their support columns and the base 80. If this is done, a second piston and cylinder type motor may be provided to move the center 42 relative to the support column 96 and base 80. If both centers 42 and 44 are movable relative to their support columns 96 and 102 and the base 80, both centers may be simultaneously moved by operation suitable motors. Of course, the centers 42 and 44 may be sequentially moved relative to their support columns 96 and 106 and the base 80 if desired.

As the conical outer side surfaces 56 and 58 on the centers 42 and 44 are moved into abutting engagement with the conical inner side surfaces 62 and 64 on the recesses 26 and 28, the root end portion 14 of the airfoil 10 is supported by the two centers. A valve handle 110 (FIG. 5) is then manually operated to cause a valve 114 to direct air under pressure to the passages 70 and 72 (FIG. 2) formed in the centers or locators 42 and 44. This fluid pressure is conducted to the conical inner or bottom end portions of the recesses 26 and 28. The handle 110 is then moved to actuate the valve 114 to a closed condition in which fluid flow through the valve is blocked.

If there are fluid tight seals between the conical outer sides surfaces 56 and 58 of the centers 42 and 44 and the conical inner side surfaces 62 and 64 of the recesses 26 and 28, fluid pressure will be maintained in the recesses for a predetermined length of time after the valve 114 has been closed. However, if there is an excessive rate of leakage of fluid pressure from one or more of the recesses 26 and 28 around the end portions 50 and 52 of the centers 42 and 44, fluid pressure will not be maintained in at least one of the recesses 26 and 28. The relatively high rate of leakage of fluid from one or both of the recesses 26 and 28 provides a clear indication that at least one recess has not been properly formed. Thus, if the rate of leakage of fluid pressure from the recesses 26 and 28 is less than a predetermined rate, the recesses 26 and 28 have been properly formed. However, if the rate of leakage of fluid pressure from at least one of the recesses 26 or 28 is greater than a predetermined rate, the recess from which fluid is leaking has not been properly formed.

In the illustrated embodiment of the invention, the valve 114 (FIG. 5) is connected with a manifold passage 118. The manifold passage 118 is connected with pressure regulators 122 and 124. The pressure regulators 122 and 124 are in turn connected with centers or locators 42 and 44 by the conduits 70 and 72. The conduits 70 and 72 are partially formed by hoses which extend between the pressure regulators and connections to internal bores or passages formed in the centers or locators 42 and 44. A gauge 126 (FIG. 5) indicates the fluid pressure in the conduit 70 and recess 26. Similarly, a gauge 128 indicates the fluid pressure in the conduit 72 and recess 28.

Once the valve 114 (FIG. 5) has been closed, a leak down of fluid pressure from recess 26 and/or recess 28 will cause a resulting decrease in the fluid pressure indicated by the associated gauges 126 and/or 128. Of course, if suitable seals are obtained between the centers or locators 42 and 44 and the recesses 26 and 28 due to proper formation of both of the recesses, the fluid pressure will be maintained in the recesses for a length of time sufficient to provide a clear indication to an operator of the fixture 36 that the recesses have been correctly formed.

In the illustrated embodiment of the invention, a single valve 114 has been provided to control the flow of fluid (air) pressure to the two recesses 26 and 28. Therefore, the recesses 26 and 28 are simultaneously connected with fluid pressure by actuation of the valve 114. However, if desired, separate valves may be provided to connect the recesses 26 and 28 with a source of fluid pressure. This would enable the recesses 26 and 28 to be sequentially pressurized.

A source of air under pressure is connected with the valve 114 (FIG. 5) and a valve 130 through a hose 132 and a manifold passage 134. The valve 130 is connected with the motor 108. Upon manual actuation of a handle 136 connected with valve 130, fluid (air) under pressure is conducted through a hose 140 to the motor 108. The fluid pressure conducted through the hose 140 causes the motor 108 to extend the center or locator 44. Thus operation of the motor 108 moves the center or locator 44 toward the stationary center or locator 42. When the valve 130 is released, a return spring 146 connected with the center 44 is operable to retract the center or locator. This results in the center 44 moving toward the right as viewed in FIG. 5. Rightward movement of the center or locator 44, under the influence of the spring 146, operates the motor 108 to an initial or retracted condition.

In the illustrated embodiment of the fixture 36, the conduits 70 and 72 are connected in parallel fluid communication with the recesses 26 and 28 (FIG. 2) through the manifold passage 118 (FIG. 5). Therefore, a leakage of fluid (air) from one of the recesses 26 or 28 is effective to cause a reduction in the fluid pressure conducted to both recesses.

If desire, the fluid conduits 70 and 72 may be isolated from each other so that a leakage of the fluid (air) from one of the recesses 26 or 28 does not result in a reduction in the fluid pressure at the other recess. This may be accomplished by suitable valving, such as check valves. If a reduction in fluid pressure in one recess 26 or 28 does not result in a corresponding reduction in fluid pressure in the other recess, the gauges 126 and 128 will indicate which recess 26 or 28 has been incorrectly formed. The gauge 126 or 128 associated with the correctly formed recess 26 or 28 will indicate that fluid pressure has been maintained in the correctly formed recess. The gauge 126 or 128 associated with the incorrectly formed recess will indicate that fluid pressure has been reduced in the incorrectly formed recess. If both recesses 26 and 28 have been correctly formed, the gauges 126 and 128 will indicate that fluid pressure has been maintained at a value above a predetermined pressure for a predetermined length of time.

The support 78 (FIGS. 5 and 7) is disposed on a slide 162 which is positioned on the base 80 by engagement with rails 164 and 166. After the slide 162 has moved to a desired position for the support 78, the slide is locked against movement relative to the rails 164 and 166. The support 78 includes an upper (as viewed in FIG. 7) end portion 170 which engages a side of the airfoil portion 12 at a location adjacent to the tip portion 16 of the airfoil. The upper end portion 170 of the support 78 can be moved relative to the slide 62 to enable the orientation of the airfoil 10 to be adjusted relative to the base 80 (see FIG. 3). It is believed that it may be desired to adjust the support 78 to have the airfoil 10 in a horizontal orientation.

Eyebolts 174 and 176 are connected with the base 80 adjacent to the support 78. Similarly, eyebolts 178 and 180 (FIG. 5) are connected with the base 80 adjacent to the centers or locates 42 and 44. The eyebolts 174-180 facilitate handling of the fixture 36.

If desired, a lifting apparatus 190 (FIGS. 8-10) may be utilized in association with the fixture 36. The lifting apparatus 190 includes a base block 194 which is disposed between the guide rails 90 and 92 (FIG. 5) of the fixture 36. The base block 194 (FIG. 8) is disposed midway between the gauge heads 38 and 40. A movable support block 196 is disposed above the base block 194. The movable support block 196 is urged toward the base block 194 by coil springs 200 (FIGS. 8 and 10). Although only one coil spring 200 has been shown on the left (as viewed in FIG. 8) side of the lifting apparatus 190, it should be understood that a coil spring is disposed on the right side of the apparatus.

An actuator lever 206 is pivotally mounted on the base block 194. Upon manual depression of the actuator lever 206, the end of the lever disposed between the movable support block 196 and the base block 194 is effective to move the support block 196 upward against the influence of the biasing springs 200 (FIG. 9). When the actuator lever 206 is released, the biasing springs 200 are effective to press the support block 196 against the base block 194 in the manner illustrated in FIG. 10. Rather than using the manually actuated lever 206 to raise the root portion 14 of the airfoil 10 and the support block 196, hydraulic and/or electric motors may be utilized to raise the root portion of the airfoil and the support block.

When the lifting apparatus 190 is to be utilized in association with the fixture 36, the root portion 14 of the airfoil 10 is positioned between the gauge heads 38 and 40 with the center 44 retracted toward the right as viewed in FIGS. 5, 6 and 8. At this time, the root portion 14 of the airfoil 10 is resting on and supported by the movable support block 196 (FIG. 8) in the lifting apparatus 190. The actuator lever 206 (FIG. 9) is manually depressed to move the movable support block 196 upward. As this occurs, the recesses 26 and 28 (FIG. 2) in the root portion 14 of the airfoil 10 move upward toward an axis 202 (FIG. 8) which extends between the centers 42 and 44.

When the recesses 26 and 28 have been moved upward to a position in which the central axis 32 of the recesses 26 and 28 (FIG. 1) is coincident with a central axis 202 (FIG. 8) of the centers 42 and 44 (see FIG. 9), the actuator lever 206 is held stationary. It should be understood that at this time the recesses 26 and 28 will have been visually aligned with the centers 42 and 44. Although the axis 32 extending between the locating recesses 26 and 28 will not be in exact alignment with the axis 202 extending between the centers 42 and 44, there will be substantial alignment of the axis 32 with an axis 202 extending between the centers 42 and 44.

Once the lifting apparatus 190 has moved the root portion 14 upward to a position in which the recesses 26 and 28 are substantially aligned with the centers 42 and 44, the motor 108 (FIG. 6) is operated to move the center 44 toward the stationary center 42. As this occurs, a slight camming action may occur between the conical outer side surfaces 56 and 58 on the centers 42 and 44 and the conical inner side surfaces 62 and 64 on the recesses 26 and 28. This camming action will be effective to move the root portion 14 of the airfoil 10 into exact alignment with the centers 42 and 44 in the gauge heads 38 and 40 (FIG. 10).

As this camming action is occurring, the actuator lever 206 is released to enable the support block 196 to move downward toward the base block 194 to the position illustrated in FIG. 10. As the support block 196 is lowered, the root portion 14 of the airfoil 10 is supported by the centers 42 and 44 in the gauge heads 38 and 40. At this time, the support block 196 is spaced from the airfoil 10 by a distance indicated at 207 in FIG. 10. Therefore, the support block 196 is ineffective to support the root portion 14 of the airfoil 10. After the support block 196 has been disengaged from the root portion 14 of the airfoil 10 (FIG. 10), the valve 114 is actuated to pressurize the recesses 26 and 28. Thus, during pressurization of the recesses 26 and 28, the root portion 14 of the airfoil 10 is supported by the centers 42 and 44.

It should be understood that the use of the lifting apparatus 190 is optional. If desired, the root portion 14 of the airfoil 10 may be manually lifted. However, it is believed that the lifting apparatus 190 will facilitate production during which recesses 26 and 28 in a substantial number of airfoils 10 are inspected. It is also believed that use of the lifting apparatus 190 will facilitate avoiding damage to the centers 42 and 44 during lifting of an airfoil 10.

In view of the foregoing description, it is apparent that the present invention provides an improved method of inspecting recesses 26 and 28 formed in an airfoil 10. The method includes engaging a surface 62 of a first recess 26 formed in a first side 30 of the airfoil 10 with a surface 56 on a first gauge head 38. A surface 64 of a second recess 28 formed in a second side 31 of the airfoil 10 is engaged by a surface 58 on a second gauge head 40. Fluid pressure is conducted to the recesses 26 and 28 in the airfoil while the surfaces 56 and 58 on the gauge heads 38 and 40 are disposed in engagement with the recesses. A determination is made as to whether or not a rate of leakage of fluid pressure from the recesses 26 and 28 in the airfoil 10 is greater than or less than a predetermined rate.

If desired, the airfoil 10 may be at least partially supported by the gauge heads 38 and 40 during the conducting of fluid pressure to the recesses 26 and 28. The forces applied by the illustrated gauge heads 38 and 40 are directed in opposite directions along the coincident central axes of the recesses 26 and 28. In one specific embodiment, a lifting apparatus 190 was used to move the recesses 26 and 28 toward a position in which the recesses are aligned with the gauge heads 38 and 40.

The present invention has many different of features. These features may be utilized together in the manner disclosed herein. Alternatively, these features may be used separately or used in different combinations with features from the prior art. For example, the gauge heads 38 and 40 may be used without the lifting apparatus 190.

Having described the invention, the following is claimed:

1. A method of inspecting recesses formed in an airfoil, said method comprising the steps of positioning the airfoil in a fixture with a first end portion of the airfoil engaging a support disposed above a base of the fixture, engaging a surface of a first recess formed in a first side of the airfoil with a surface on a first gauge head, engaging a surface of a second recess formed in a second side of the airfoil with a surface on a second gauge head, the surface on the first gauge head has a configuration which corresponds to the configuration of the surface of the first recess in the airfoil, the surface on the second gauge head has a configuration corresponding to the configuration of the surface on the second recess in the airfoil, said steps of engaging surfaces of this first and second recesses with first and second gauge heads includes engaging a second end portion of the airfoil with the first and second gauge heads, conducting fluid pressure to the first recess in the airfoil while the surface on the first gauge head is disposed in engagement with the surface on the first recess in the airfoil, conducting fluid pressure to the second recess in the airfoil while the surface on the second gauge head is disposed in engagement with the surface on the second recess in the airfoil, determining whether a rate of leakage of fluid pressure from the first recess in the airfoil is greater than or less than a predetermined rate, and determining whether a rate of leakage of fluid pressure from the second recess in the airfoil is greater than or less than a predetermined rate.

2. A method as set forth in claim 1 further including the step of at least partially supporting the airfoil with the first and second gauge heads during performance of said steps of conducting fluid pressure to the first and second recesses in the airfoil.

3. A method as set forth in claim 1 further including the step of using a drill to form the first recess in the first side of the airfoil and using a drill to form the second recess in the second side of the airfoil.

4. A method as set forth in claim 3 wherein said step of using a drill to form the first recess in the first side of the airfoil includes forming the surface of the first recess with a conical configuration, said step of using a drill to form the second recess in the second side of the airfoil includes forming the surface of the second recess with a conical configuration and with a central axis which is coincident with a central axis of the first recess.

5. A method as set forth in claim 1 wherein the surface on the first gauge head has a first axis, the surface on the second gauge head has a second axis which is coincident with the first axis, said step engaging the surface of the first recess with a surface on the first gauge head includes applying a first force against the surface of the first recess with the first gauge head, said step of engaging the surface of the second recess with a surface on the second gauge head includes applying a second force against the surface of the second recess with the second gauge head, said first and second forces being directed in opposite directions along the coincident central axes of the surfaces on the first and second gauge heads.

6. A method as set forth in claim 1 wherein said step of conducting fluid pressure to the first recess in the airfoil includes conducting fluid pressure through at least a portion of the first gauge head, said step of conducting fluid pressure to the second recess in the airfoil includes conducting fluid pressure through at least a portion of the second gauge head.

7. A method as set forth in claim 1 wherein said step of engaging a surface of a first recess formed in a first side of the airfoil with a surface on a first gauge head includes pressing the surface on the first gauge head against the surface of the first recess, said step of engaging a surface of a second recess formed in a second side of the airfoil with a surface on a second gauge head includes pressing the surface on the second gauge head against the surface of the second recess.

8. A method as set forth in claim 7 further including the step of supporting the airfoil with the first and second gauge heads while pressing the surfaces on the first and second gauge heads against the surfaces of the first and second recesses.

9. A method as set forth in claim 1 wherein said steps of engaging surfaces of first and second recesses with first and second gauge heads includes maintaining the first gauge head stationary relative to the base of the fixture, moving the surface of the first recess into engagement with the first gauge head while the first gauge head is stationary relative to the base of the fixture, moving the second gauge head relative to the base to move the surface on the second gauge head into engagement with the surface of the second recess while the first gauge head is stationary relative to the base of the fixture.

10. A method as set forth in claim 1 further including the step of supporting the second end portion of the airfoil under the influence of forces transmitted between the first and second gauge heads and the first and second recesses.

11. A method as set forth in claim 1 further including the step of lifting the airfoil to move the first and second recesses toward a position in which the first and second recesses are aligned with the first and second gauge heads.

12. A method as set forth in claim 11 wherein said step of lifting the airfoil includes engaging the airfoil with a support member and moving the support member upward, said steps of determining whether a rate of leakage of fluid pressure from the first and second recesses in the airfoil is performed with the support member spaced from the airfoil.

* * * * *